Patented Feb. 21, 1933                                              1,898,088

UNITED STATES PATENT OFFICE

CHESTER G. GAUERKE, OF WILMINGTON, DELAWARE, ASSIGNOR TO E. I. DU PONT DE NEMOURS & COMPANY, OF WILMINGTON, DELAWARE, A CORPORATION OF DELAWARE

COATING COMPOSITION CONTAINING BETA-ELEOSTEARIN

No Drawing.          Application filed May 18, 1928. Serial No. 278,921.

This invention relates to coating compositions and more particularly to a coating composition containing beta-eleostearin.

It has been known for a number of years that if raw China-wood oil be subjected to the action of light for a long period of time or treated with certain chemical agents, as for example, iodine in a suitable solvent, the triglyceride of alpha-eleostearic acid (alpha-eleostearin), which comprises from 75% to 85% of the raw oil, is completely or almost completely transformed into a solid. This solid is commonly supposed to be the beta-isomer of the liquid alpha-eleostearin. While this phenomenon has been known for some time, this purified wood oil fraction, which is not readily soluble in the usual organic solvents, has not hitherto, so far as I know, been utilized in protective coating compositions.

This invention has as an object the solubilizing of beta-eleostearin. A further object is the providing of a quick drying coating composition which will produce a hard, tough film. Other objects will appear hereinafter.

These objects are accomplished by the following invention of a process for solubilizing beta-eleostearin and a coating composition formed therefrom.

The separation and purification of beta-eleostearin can be effected in several different ways but I have found the following method advantageous. Raw China-wood oil is treated with about .03 to .05% of iodine (based on the weight of oil) in a dilute alcoholic solution (2½ to 5%). The oil thus treated is allowed to stand until it has set to a more or less completely solid mass, which usually requires several days, after which the oil is thoroughly mixed with about one-third of its weight of acetone and centrifuged to remove the liquid residue, which is soluble in the acetone. While in the centrifuge the solid oil is washed with several successive portions of acetone to secure a product as free as possible from traces of iodine and liquid oil residue. The yield of solid oil is approximately 50% of the weight of the raw oil used. The purified material obtained is known as beta-eleostearin and is a white solid with a melting point of about 61° C. It is more or less insoluble in the ordinary oil solvents.

I have discovered that if the solid oil be heat treated to about 500° F. it can then be cut with certain solvents such as high boiling gasoline or hi-flash naphtha. Simple solutions exhibit the fast drying property and may be satisfactorily used as coating compositions. This same fast drying property may be imparted to the more complex varnishes such as those containing either fossil or synthetic resins, with or without drying oils, such as linseed, by the incorporation of beta-eleostearin.

The following examples illustrate varnishes to which the fast drying property has been imparted by the use of my invention:—

*Example 1*

| | Grams |
|---|---|
| Modified polyhydric alcohol-polybasic acid resin | 285 |
| Beta-eleostearin | 105 |
| High boiling gasoline | 597 |
| Cobalt liquid drier | 13 |

Melt the resin to 410° F. and add the beta-eleostearin, holding at 410° F. while the beta-eleostearin is added. Then treat at 500° F. during 25 minutes and hold at 500° F. one hour. Cut hot with gasoline and add drier.

The polyhydric alcohol-polybasic acid resin may be prepared from phthalic anhydride and glycerol (3 mols of the former to two of the latter), and modified by rosin glyceride (35% polyhydric alcohol-polybasic acid and 65% rosin glyceride). The cobalt drier may consist of a solution of cobalt linoleate in turpentine, containing about 75% of cobalt (as metal).

*Example 2*

| | Grams |
|---|---|
| Phenol-formaldehyde-rosin resin | 227 |
| Beta-eleostearin | 355 |
| Litharge (PbO) | 9 |
| Black oxide of manganese ($MnO_2$) | 3.4 |
| High boiling gasoline | 660 |

Melt the phenol-formaldehyde-rosin resin with the beta-eleostearin, heating to 400° F. in 15 minutes. Add the litharge and manganese dioxide and heat to 525° F. in 8 minutes. Cool to 500° F. in 2 minutes, hold 9 minutes at 500° F. and cut with high boiling gasoline (total time of heat, 34 minutes).

*Example 3*

| | Grams |
|---|---|
| East India gum | 227 |
| Linseed oil | 176 |
| Beta-eleostearin | 249 |
| Lead-manganese resinate liquid drier | 33 |
| High boiling gasoline | 625 |

Melt the East India gum with linseed oil and heat to 580° F. in 32 minutes. Add 71 grams of beta-eleostearin and heat back to 580° F. Repeat, using two more portions of 71 grams each and finally the remainder of 36 grams of beta-eleostearin, each time heating back to 580° F. Cool to 300° F. and reduce with high boiling gasoline (total time of heat, 46 minutes).

The liquid drier may preferably contain about 5% lead and 1.65% manganese.

Heat-treated beta-eleostearin may be advantageously used in any type of coating composition in which ordinary drying oils are normally used, either clear or pigmented, and the beta-eleostearin may be used alone as the film forming constituent, or with other oils, gums or resins as one of the several film forming constituents.

Coating compositions made in accordance with the procedure herein described have been found to dry tack-free in a much shorter time than the ordinary coating compositions and form a hard, tough, smooth film.

By the term "modified polyhydric alcohol-polybasic acid resin", as used herein, I mean a resin derived from the interaction of a polyhydric alcohol, a polybasic acid, and one or more modifying ingredients, such as rosin glyceride.

As many apparently widely different embodiments of this invention may be made without departing from the spirit and scope thereof, it is to be understood that I do not limit myself to the specific embodiments thereof except as defined in the appended claims.

I claim:

1. Heat-treated beta-eleostearin which is soluble in high boiling gasoline.

2. Process for solubilizing beta-eleostearin which comprises heat treating it at a temperature of around 500° F.

3. Process for making a coating composition which comprises heating beta-eleostearin to a temperature of around 500° F. and dissolving the product of said heating in high boiling gasoline.

4. The process of making a coating composition which comprises treating China-wood oil to convert alpha-eleostearin to beta-eleostearin, separating out the beta-eleostearin, heat-treating it and mixing the resulting product with solvent and pigment.

5. The process of making a coating composition which comprises mixing a resin and beta-eleostearin, heating this mixture at around 500° F., dissolving the heated product in a solvent, and adding a drier.

6. Process for making a coating composition which comprises melting a resin, mixing therewith beta-eleostearin, raising the temperature of this mixture to around 500° F., dissolving the heated product in high boiling gasoline and adding a drier.

7. A coating composition containing material amounts of the product resulting from the heat treatment of beta-eleostearin and a solvent therefor, said composition being substantially free from the non-eleostearin components of China-wood oil.

8. A coating composition containing the product resulting from the heat treatment of substantially pure beta-eleostearin, a solvent therefor, a resin, and a drier.

9. A coating composition containing the product resulting from the heat treatment of substantially pure beta-eleostearin, a solvent therefor, and pigment.

10. A coating composition containing material amounts of the product resulting from the heat treatment of beta-eleostearin, a solvent therefor, a drier, and pigment, said composition being substantially free from the non-eleostearin components of China-wood oil.

11. A coating composition containing the product resulting from the heat treatment of substantially pure beta-eleostearin, a modified polyhydric alcohol-polybasic acid resin, high boiling gasoline and cobalt liquid drier.

In testimony whereof, I affix my signature.

CHESTER G. GAUERKE.